United States Patent
Rahim et al.

(10) Patent No.: US 11,996,533 B2
(45) Date of Patent: May 28, 2024

(54) UTILIZATION OF DEAD CHANNEL TO IMPROVE TEMPERATURE UNIFORMITY ON THERMAL INTERFACE MATERIAL

(71) Applicant: Dana Canada Corporation, Oakville (CA)

(72) Inventors: Noman Rahim, Oakville (CA); Jiang Feng Yu, Oakville (CA); Benjamin A. Kenney, Oakville (CA); Mohammed Anush Nayeemullah, Oakville (CA); Farbod Vakilimoghaddam, Oakville (CA)

(73) Assignee: DANA CANADA CORPORATION, Oakville (CA)

( * ) Notice: Subject to any disclaimer, the term of this patent is extended or adjusted under 35 U.S.C. 154(b) by 798 days.

(21) Appl. No.: 16/972,536

(22) PCT Filed: Jun. 7, 2019

(86) PCT No.: PCT/CA2019/050802
§ 371 (c)(1),
(2) Date: Dec. 4, 2020

(87) PCT Pub. No.: WO2019/232642
PCT Pub. Date: Dec. 12, 2019

(65) Prior Publication Data
US 2021/0242516 A1  Aug. 5, 2021

Related U.S. Application Data

(60) Provisional application No. 62/682,610, filed on Jun. 8, 2018.

(51) Int. Cl.
*H01M 10/6556* (2014.01)
*B60L 50/64* (2019.01)
(Continued)

(52) U.S. Cl.
CPC ......... *H01M 10/6556* (2015.04); *B60L 50/64* (2019.02); *B60L 58/26* (2019.02);
(Continued)

(58) Field of Classification Search
CPC ...... F28F 3/12; F28F 2210/10; F28F 2270/02; F28D 1/035
See application file for complete search history.

(56) References Cited

U.S. PATENT DOCUMENTS 4,982,785 A * 1/1991 Tomlinson ............... F28F 3/12
165/170
5,359,989 A * 11/1994 Chase ..................... F24H 3/105
165/170

(Continued)

OTHER PUBLICATIONS

ISA Canadian Intellectual Property Office, International Search Report and Written Opinion Issued in Application No. PCT/CA2019/050802, dated Aug. 22, 2019, WIPO, 11 pages.

*Primary Examiner* — Joseph F Trpisovsky
(74) *Attorney, Agent, or Firm* — McCoy Russell LLP (57) ABSTRACT

A heat exchanger includes first and second plates joined together with portions of the inner surfaces spaced apart to define a plurality of fluid flow passages for flow of a heat transfer fluid. A dividing rib separates the heat exchanger into an inlet section and an outlet section, each of which includes a plurality of fluid flow passages. Inlet and outlet ports are located near a first end of the heat exchanger, on opposite sides of the dividing rib. The heat transfer surface area of the inlet section is less than that of the outlet section due to the presence of one or more flow obstructions between the inlet port and first ends of the fluid flow passages in the inlet section. Each flow obstruction may be a dead channel including a continuous outer rib completely surrounding a depressed middle region.

20 Claims, 12 Drawing Sheets

(51) Int. Cl.
  *B60L 58/26* (2019.01)
  *F28D 1/03* (2006.01)
  *F28F 3/12* (2006.01)
  *H01M 10/613* (2014.01)
  *H01M 10/625* (2014.01)

(52) U.S. Cl.
  CPC .............. *F28D 1/035* (2013.01); *F28F 3/12* (2013.01); *H01M 10/613* (2015.04); *H01M 10/625* (2015.04); *B60L 2240/545* (2013.01); *F28F 2210/10* (2013.01); *F28F 2270/02* (2013.01)

(56) References Cited

U.S. PATENT DOCUMENTS

| | | |
|---|---|---|
| 9,638,475 B2 | 5/2017 | Burgers et al. |
| 9,887,437 B2 | 2/2018 | Palanchon |
| 2009/0114373 A1 | 5/2009 | Sawaguchi et al. |
| 2011/0229749 A1* | 9/2011 | Kim .................. H01M 10/486 429/120 |
| 2016/0036104 A1* | 2/2016 | Kenney .................. F28F 3/12 165/170 |
| 2016/0204486 A1 | 7/2016 | Kenney et al. |
| 2016/0245598 A1 | 8/2016 | Bosscher |
| 2017/0194679 A1 | 7/2017 | Chakraborty et al. |

* cited by examiner

UTILIZATION OF DEAD CHANNEL TO IMPROVE TEMPERATURE UNIFORMITY ON THERMAL INTERFACE MATERIAL

CROSS-REFERENCE TO RELATED APPLICATIONS

This application is a U.S. National Phase of International Patent Application No. PCT/CA2019/050802, entitled "UTILIZATION OF A DEAD CHANNEL TO IMPROVE TEMPERATURE UNIFORMITY ON THERMAL INTERFACE MATERIAL", and filed on Jun. 7, 2019. International Application No. PCT/CA2019/050802 claims priority to U.S. Provisional Patent Application No. 62/682,610, entitled "UTILIZATION OF A DEAD CHANNEL TO IMPROVE TEMPERATURE UNIFORMITY ON THERMAL INTERFACE MATERIAL", and filed on Jun. 8, 2018. The entire contents of each of the above-listed applications are hereby incorporated by reference for all purposes.

TECHNICAL FIELD

The present disclosure relates to thermal management of rechargeable batteries within an energy storage system of a battery electric vehicle (BEV) or hybrid electric vehicle (HEV), and particularly to heat exchangers adapted for cooling rechargeable batteries.

BACKGROUND

Energy storage systems such as those used in BEVs and HEVs comprise rechargeable lithium-ion batteries. A typical rechargeable battery for a BEV or HEV will comprise a number of battery modules which are electrically connected together in series and/or in parallel to provide the battery with the desired system voltage and capacity. Each battery module comprises a plurality of battery cells which are electrically connected together in series and/or parallel, wherein the battery cells may be in the form of pouch cells, prismatic cells or cylindrical cells.

Rechargeable vehicle batteries in BEVs and HEVs generate large amounts of heat that need to be dissipated, therefore these types of batteries or battery systems need to be cooled to extend their service life.

Liquid cooled heat exchangers can be used to manage the thermal load of these rechargeable vehicle batteries. These battery heat exchangers typically comprise "cold plate" heat exchangers or "ICE" ("inter-cell elements") plate heat exchangers. A cold plate heat exchanger is a heat exchanger having a flat upper surface upon which one or more battery cells is arranged, wherein the number of battery cells associated with each cold plate is variable and may, depending on the area of the cold plate, comprise one or more battery modules. Typically, the battery cells arranged on the cold plate will be prismatic cells or cylindrical cells, which are housed in rigid containers. For example, prismatic cells may be housed in box-like containers which are arranged in face-to-face contact with each other.

In contrast, ICE plate heat exchangers are arranged or "sandwiched" between the adjacent pouch cells or prismatic cells, the individual ICE plate heat exchangers being fluidically connected together by common inlet and outlet manifolds. Examples of cold plate heat exchangers and ICE plate heat exchangers are described in commonly assigned U.S. patent application Ser. No. 14/972,463 entitled COUNTER-FLOW HEAT EXCHANGER FOR BATTERY THERMAL MANAGEMENT APPLICATIONS (Publication No. US 2016/0204486 A1), which is incorporated herein by reference in its entirety.

Temperature uniformity across the surface of battery heat exchangers is an important consideration in the thermal management of these types of battery units or overall battery systems as temperature uniformity across the surface of the heat exchanger relates to ensuring that there is a minimum temperature differential within the individual battery cells and between adjacent battery cells of the vehicle battery. Ensuring adequate temperature uniformity is a challenging aspect of heat exchanger design since the temperature of the heat transfer fluid will be higher at the outlet than at the inlet.

There is a need for battery heat exchangers which achieve improved temperature uniformity across the surfaces which are in contact with the battery cells.

SUMMARY

In accordance with an aspect of the present disclosure, there is provided a heat exchanger, comprising: (a) a first plate having an inner surface and an outer surface; (b) a second plate having an inner surface and an outer surface, wherein the first and second plates are joined together with their inner surfaces in opposed facing relation to one another, and with portions of the inner surfaces being spaced apart from one another; (c) a plurality of fluid flow passages adapted for flow of a heat transfer fluid, and located between the spaced apart portions of the inner surfaces of the first and second plates; (d) a dividing rib which separates the heat exchanger into an inlet section and an outlet section, each of the inlet section and the outlet section including a plurality of said fluid flow passages; (e) an inlet port located in the inlet section for supplying the heat transfer fluid to the plurality of fluid flow passages; and (e) an outlet port in the outlet section for discharging the heat transfer fluid from the plurality of fluid flow passages; wherein both the inlet port and the outlet port are located proximate to a first end of the heat exchanger, on opposite sides of the dividing rib; wherein the portions of the inner surfaces of the first and second plates which are spaced apart from one another define a total heat transfer surface area of the heat exchanger, and wherein the total heat transfer surface area is a sum of the heat transfer surface area of the inlet section and the heat transfer surface area of the outlet section; and wherein the heat transfer surface area of the inlet section is less than the heat transfer surface area of the outlet section.

BRIEF DESCRIPTION OF THE FIGURES

Exemplary embodiments of the present disclosure will now be described, by way of example, with reference to the accompanying drawings, in which.

DETAILED DESCRIPTION

The heat exchangers described herein are generally flat, planar fluid-carrying panels having opposed outer surfaces, at least one of the outer surfaces being adapted for thermal contact with one or more battery cells and/or battery module(s) of a rechargeable battery of a BEV or HEV.

A heat exchanger 10 according to a first embodiment is shown in FIGS. 1 to 7. Heat exchanger 10 comprises a first plate 12 having inner and outer surfaces 14, 16 and a second plate 18 having inner and outer surfaces 20, 22. Heat exchanger 10 is a "cold plate" in which the outer surface 16 of the first plate 12 provides a flat surface upon which one or more battery cells 2 and/or battery modules 4 are supported.

The second plate 18 has opposed inner and outer surfaces 20, 22 and is shaped, for example by stamping, drawing or molding, such that it has a generally flat, planar base 24 surrounded on all sides by a raised peripheral sidewall 26 extending from the base 24 to a planar flange 28 defining a planar peripheral sealing surface 30 on the inner surface 20 of second plate 18. The first and second plates 12, 18 are sealingly joined together with their inner surfaces 14, 20 in opposed facing relation to one another, and with portions of the inner surfaces 14, 20 being spaced apart from one another. The planar peripheral sealing surface 30 of second plate 18 is sealingly joined to a planar, peripheral sealing surface 32 on the inner surface 14 of first plate 12, with portions of the inner surfaces 14, 20 inward of respective sealing surfaces 32, 30 being spaced apart from one another.

The planar base 24 of second plate 18 is provided with a plurality of spaced apart ribs 68, 70 which define (in combination with inner surface 14 of cover plate 12) a plurality of fluid flow passages 34 having open first and second ends 36, 38. The ribs 68, 70 have first and second ends 76, 78 and extend upwardly out of the plane of the planar base 24, having a sufficient height such that the flat or rounded top surface of each rib 68, 70 defines a sealing surface which is substantially co-planar with the sealing surface 30 of planar flange 28. In assembled heat exchanger 10, the sealing surface 30 of planar flange 28 and the sealing surfaces of the ribs 68, 70 are sealingly joined to the inner surface 14 of cover plate 12, such that the inner surface 14 of cover plate 12 defines the top walls of the fluid flow passages 34, the planar base 24 of base plate 18 defines the bottom walls of the fluid flow passages 34, and the ribs 68, 70 and peripheral side wall 26 together define the sides of the fluid flow passages 34. In the present embodiment the ribs 68, 70 are straight and parallel to one another and to a central longitudinal axis X which extends between the opposite ends 72, 74 of heat exchanger 10.

Figure 1:
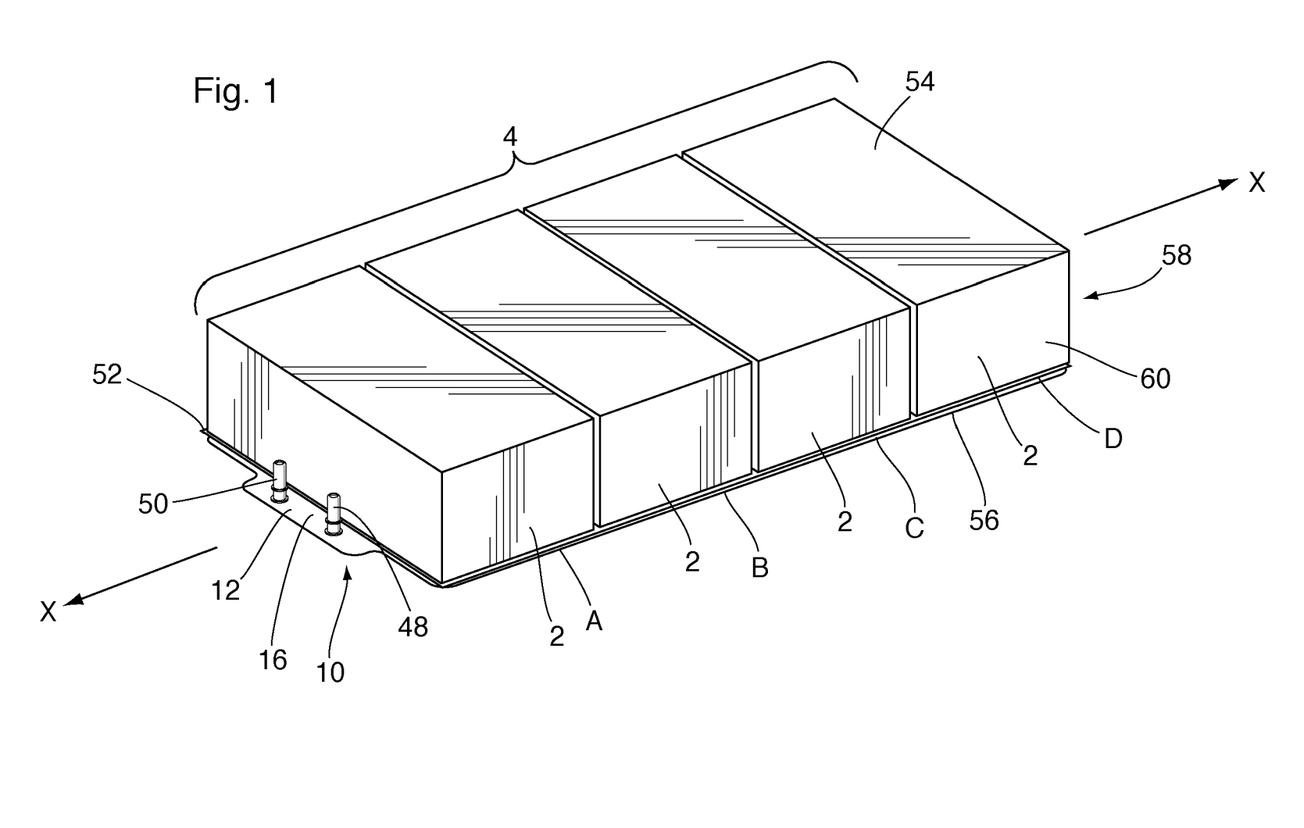
FIG. 1 is a perspective view of a battery heat exchanger with a plurality of battery cells supported on its upper surface.
Figure 2:
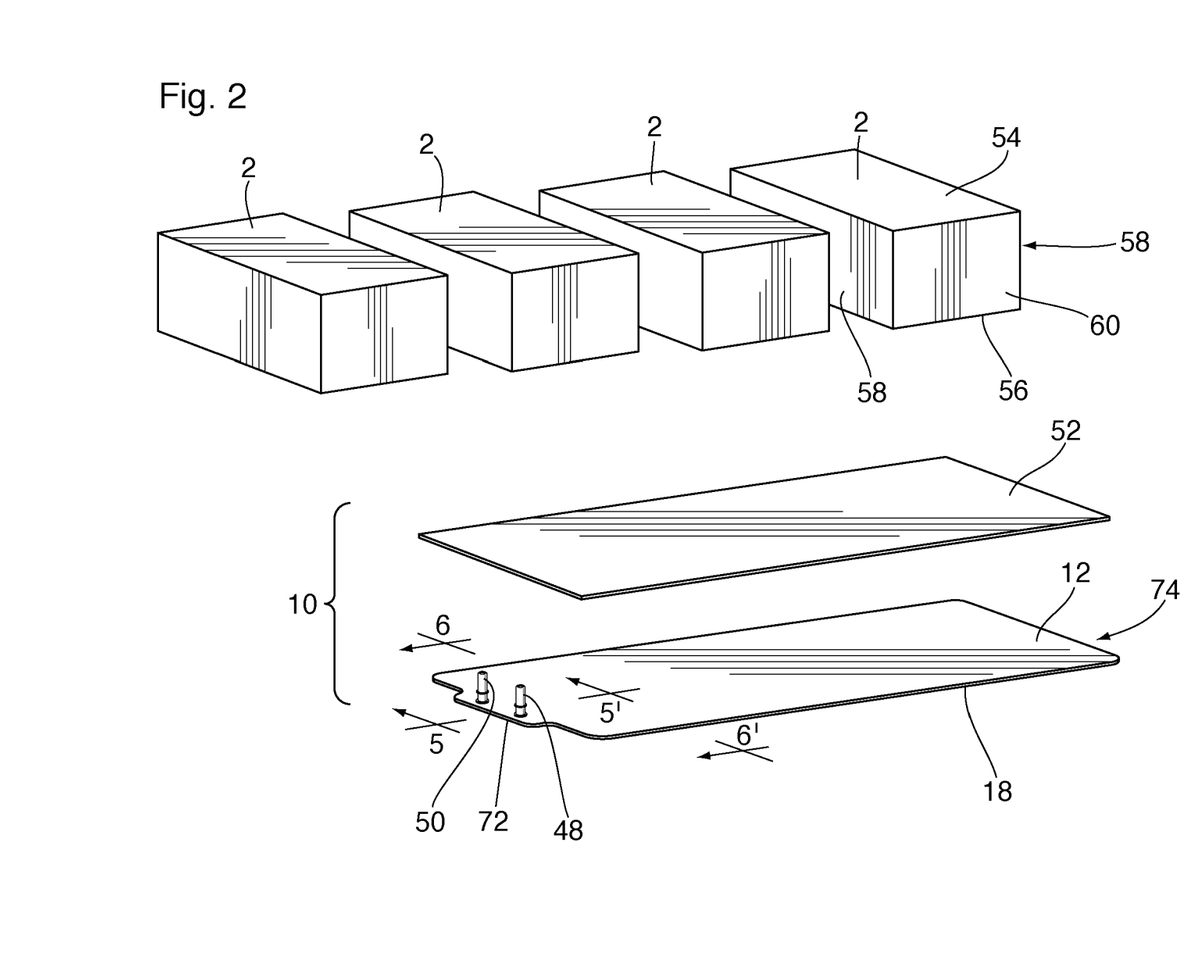
FIG. 2 is an exploded perspective view of the battery heat exchanger and battery cells of FIG. 1.

FIGS. 1 and 2 schematically show a battery module 4 comprising four prismatic battery cells 2 supported on the outer surface 16 of first plate 12. Each battery cell 2 has a plurality of rectangular surfaces, including a top surface 54, a bottom surface 56, a pair of opposed side surfaces 58, and a pair of opposed end surfaces 60. The bottom surfaces 56 are in thermal contact with the outer surface 16 of first plate 12. Although not shown, the battery cells 2 are electrically connected together, and the battery module 4 is electrically connected to other battery modules of the vehicle battery. Also, the number and arrangement of the battery cells 2 and module(s) 4 supported on the heat exchanger may differ from that shown.

A thin layer of thermal interface material (TIM) 52 (FIG. 2) is provided between the outer surface 16 of first plate 12 and the bottom surfaces 56 of the battery cells 2 to enhance thermal contact between the heat exchanger 10 and battery cells 2. The TIM may comprise a thermally conductive grease, wax or metallic material.

Heat exchanger 10 is configured for a U-shaped flow pattern of heat transfer fluid across the inner surface 20 of the second plate 18. Rib 68 is a dividing rib which separates the heat exchanger 10 into an inlet section 64 and an outlet section 66. Dividing rib 68 extends along the central longitudinal axis X such that the inlet and outlet sections 64, 66 have substantially the same surface area. The first end 76 of dividing rib 68 is joined to the peripheral side wall 26 at the first end 72 of heat exchanger 10, and the second end 78 of dividing rib 68 is located proximate to, and spaced from, the second end 74 of heat exchanger 10 and the peripheral side wall 26 at the second end 74. All of the heat transfer fluid must flow through the gap between second end 78 of dividing rib 68 and peripheral side wall 68 in order to pass from the inlet section 64 to outlet section 66.

Figure 4:
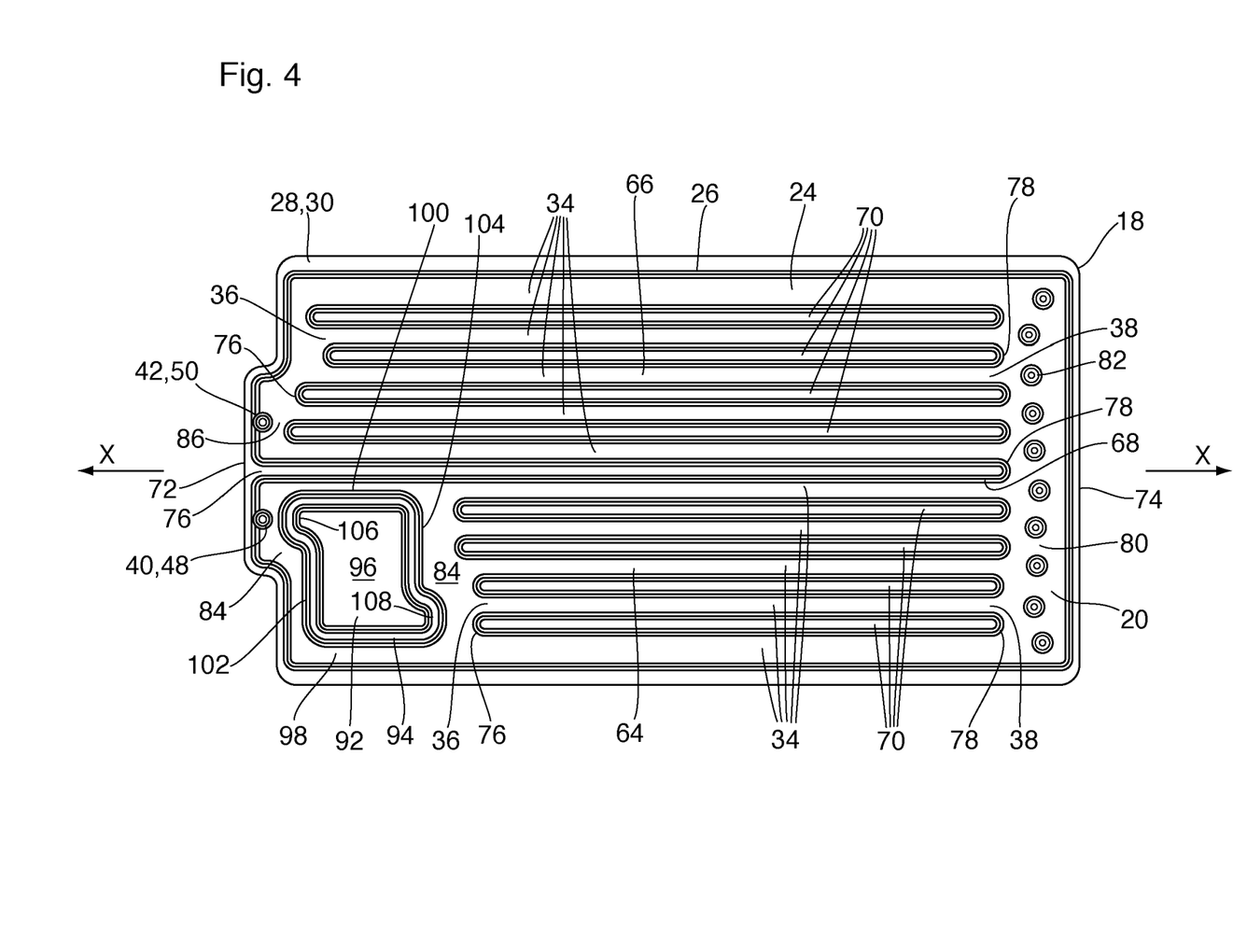
FIG. 4 is a top plan view of the bottom plate of the battery heat exchanger of FIG. 1.
Figure 5:
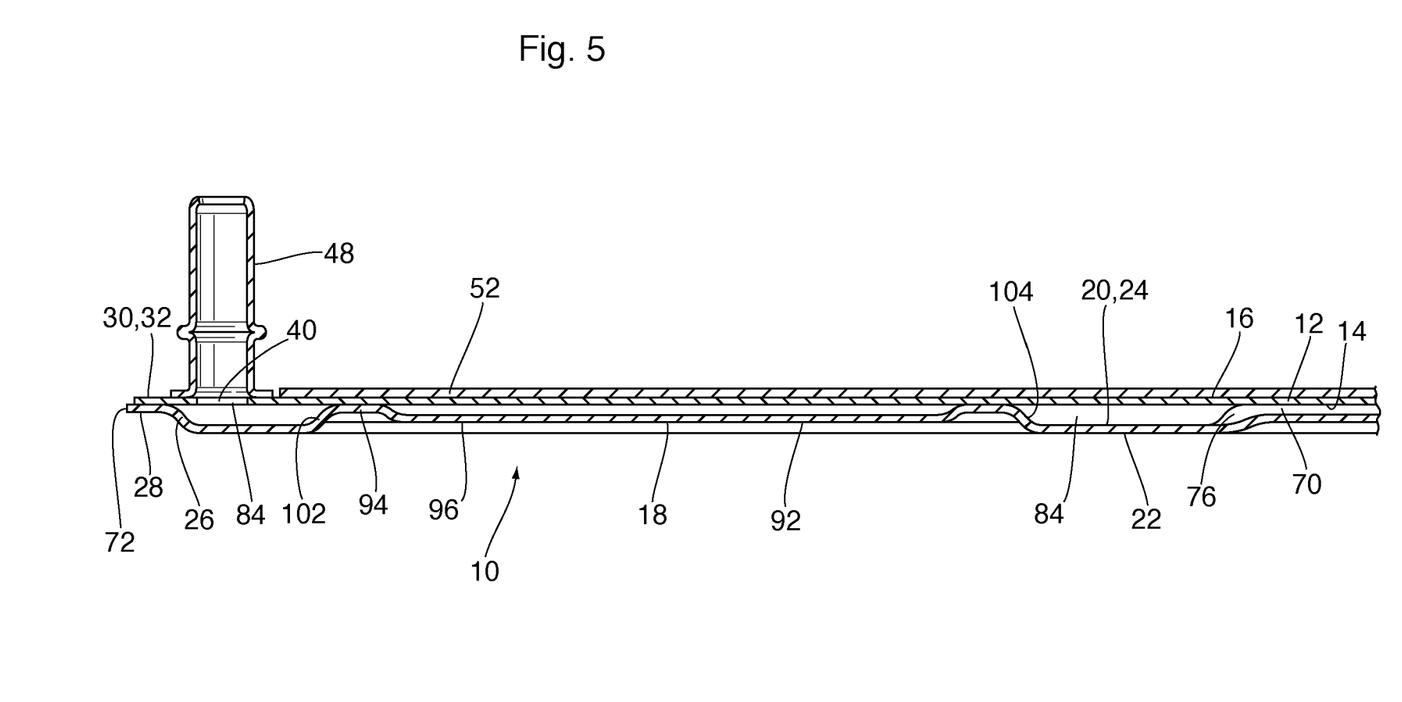
FIG. 5 is a longitudinal cross-section along line 5-5' of FIG. 2.
Figure 6:
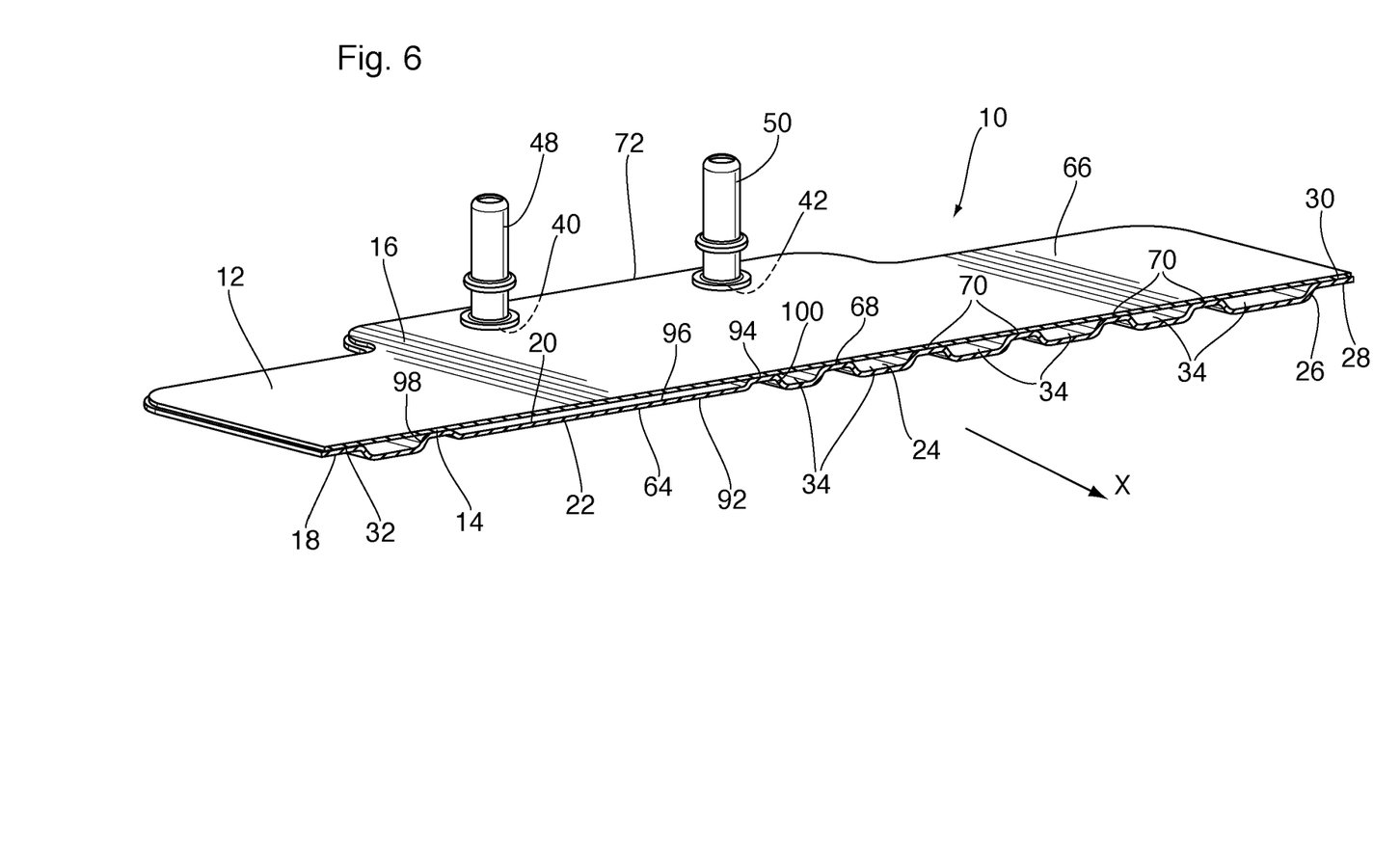
FIG. 6 is a transverse cross-section along line 6-6' of FIG. 2.

Ribs 70 separate adjacent fluid flow passages 34 and are referred to herein as "channel ribs". The first ends 76 of channel ribs 70 are spaced from the peripheral side wall 26 at the first end 72 of heat exchanger 10, and the second ends 78 of channel ribs 72 are spaced from the peripheral side wall 26 at the second end 74 of heat exchanger 10. Although not essential, there are equal numbers of channel ribs 70 on either side of dividing rib 68 in heat exchanger 10, so that inlet and outlet sections 64, 66 have the same number of fluid flow passages 34.

Figure 3:
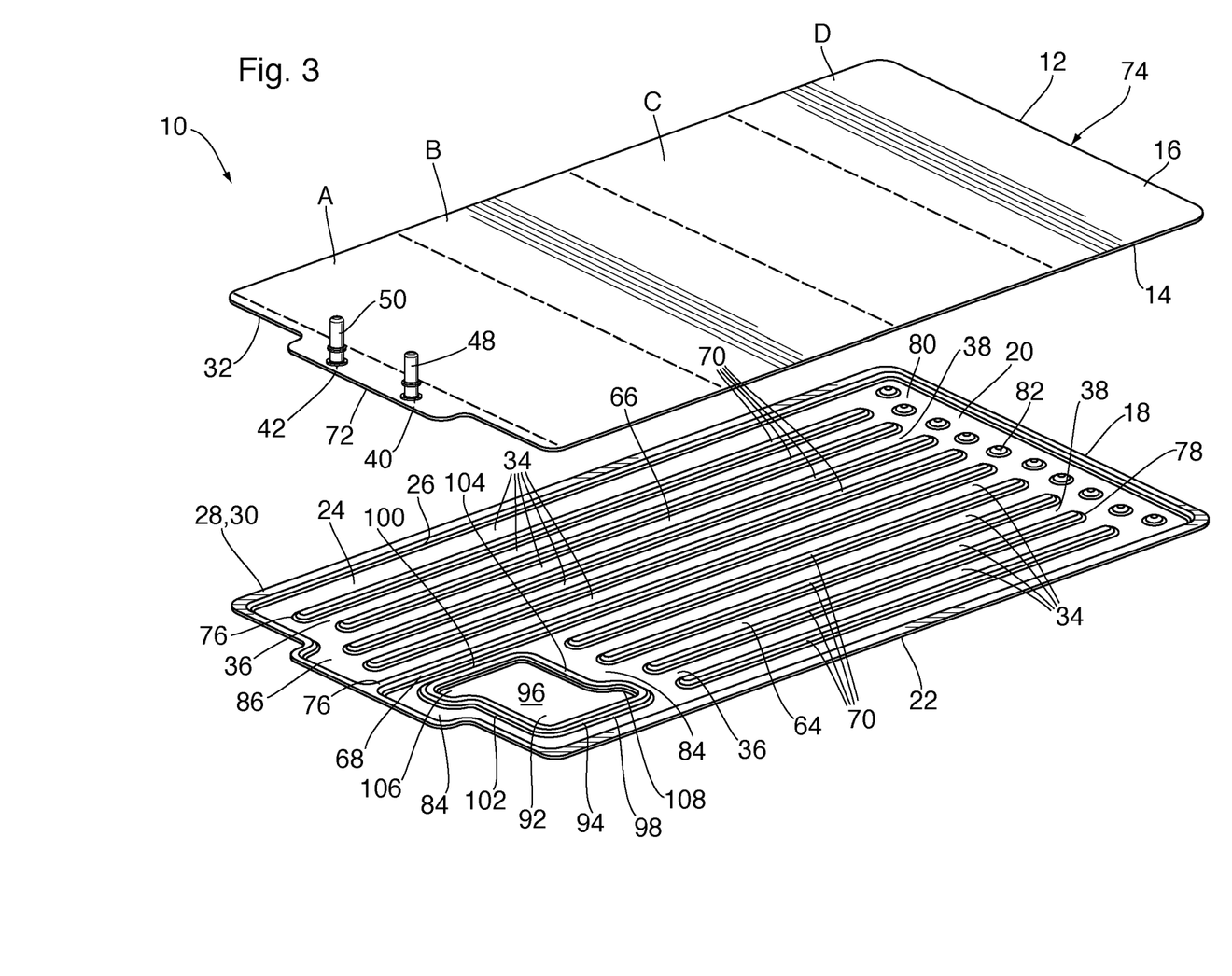
FIG. 3 is an exploded perspective view of the battery heat exchanger of FIG. 1.

Heat exchanger 10 further comprises inlet and outlet ports 40, 42 located in the respective inlet and outlet sections 64, 66. Inlet port 40 is adapted to supply heat transfer fluid to the inlet section 64 and outlet port 42 is adapted to discharge heat transfer fluid from outlet section 66. The inlet and outlet ports 40, 42 comprise apertures in the first plate 12, located inwardly of the planar peripheral sealing surface 32. Due to the U-flow configuration of heat exchanger 10, the inlet and outlet ports 40, 42 are both located along one of the edges of the first plate 12 and, proximate to the first end 72 of heat exchanger 10.

The inlet port 40 is provided with a tubular inlet fitting 48 and the outlet port 42 is provided with a tubular outlet fitting 50, the fittings 48, 50 projecting upwardly from the outer surface 16 of first plate 12, to provide flow communication between the fluid flow passages 34 and a fluid circulation system (not shown) of the vehicle. The ports 40, 42 and fittings 48, 50 are located outside of, and immediately adjacent to, the area of the outer surface 16 of first plate 12 which is occupied by battery cells 2.

A turnaround area 80 is defined in the space separating the second ends 38 of fluid flow passages 34 and the second ends 78 of ribs 68, 70 from the peripheral side wall 26 at the second end 74 of heat exchanger 10. This turnaround area 80 extends transversely across the width of heat exchanger 10, and permits the heat transfer fluid to exit the fluid flow passages 34 of inlet section 64 and enter the fluid flow passages 34 of outlet section 66. Turnaround area 80 may include support structures such as dimples 82 projecting upwardly from the planar base 24 of second plate 18 and sealingly joined to inner surface 14 of first plate 12.

An inlet manifold area 84 is provided in the vicinity of inlet port 40, in the space separating the first ends 36, 76 of fluid flow passages 34 and channel ribs 70 from the peripheral side wall 26 at the first end 72 of heat exchanger 10. Similarly, an outlet manifold area 86 is provided in the vicinity of the outlet port 42, in the space separating the second ends 38, 78 of fluid flow passages 34 and channel ribs 70 in the outlet section 66 from peripheral side wall 26 at the first end 72 of heat exchanger 10.

Figure 7:
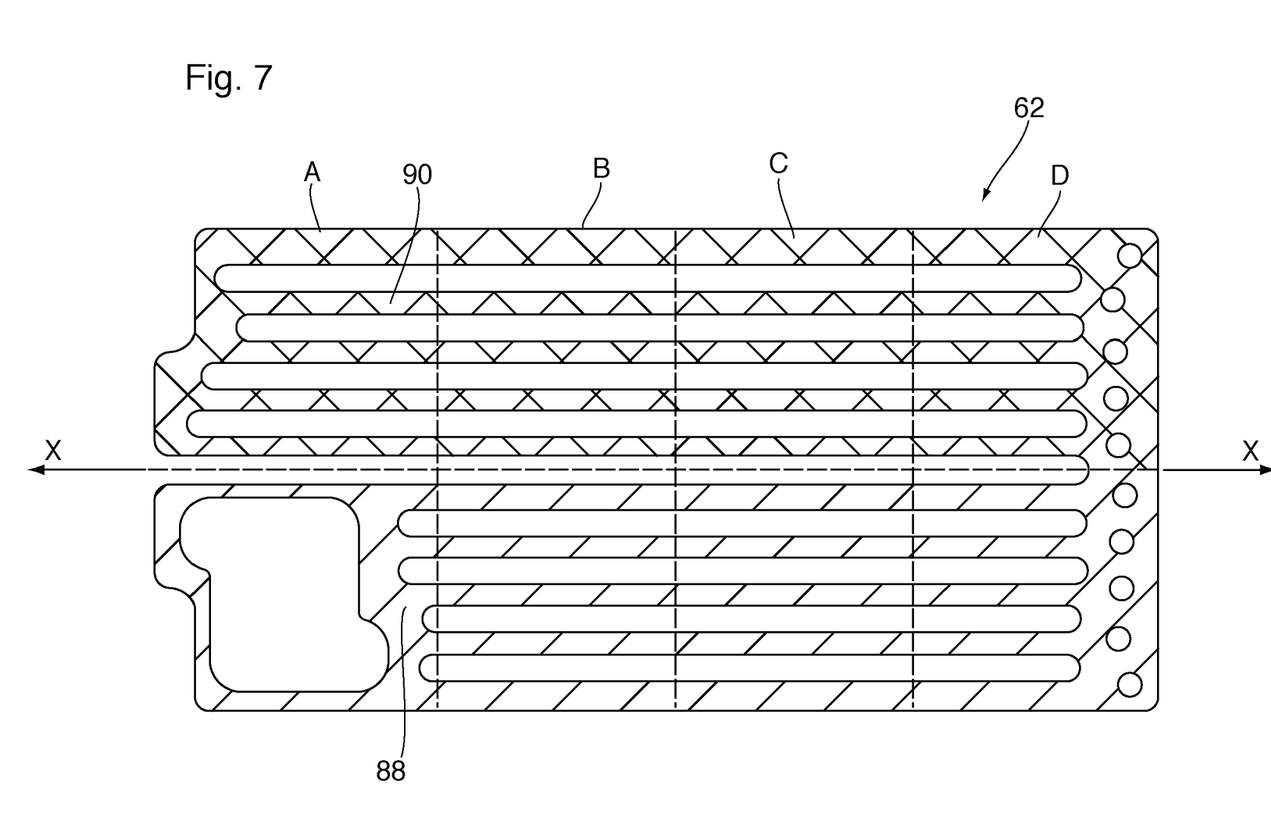
FIG. 7 illustrates the heat transfer surface area of the heat exchanger of FIG. 1.

Due to the presence of ribs 68, 70 and dimples 82, etc., the surface area of the regions of heat exchanger 10 through which the heat transfer fluid flows is smaller than the total surface area of first plate 12, and smaller than the total surface area occupied by the battery cells 2. In this regard, the regions through which the heat transfer fluid flows are those regions in which the first and second plates 12, 18 are spaced apart from one another, including fluid flow passages 34, turnaround area 80, and manifold areas 84, 86. The total surface area of these regions throughout the entire heat exchanger 10 is illustrated in FIG. 7 and is defined herein as the "total heat transfer surface area 62" of the heat exchanger 10. In addition, the inlet and outlet sections 64, 66 each have a heat transfer surface area, identified in in FIG. 7 by numerals 88 and 90, respectively. In FIG. 7 the heat transfer surface areas 88, 90 are differentiated by different hatching, and it can be seen that central axis X separates the heat transfer surface areas 88, 90. The total heat transfer surface area 62 of heat exchanger 10 is the sum of the heat transfer areas 88 and 90 of the inlet and outlet sections 64, 66.

The first and second plates 12, 18 may be comprised of aluminum or alloys thereof, and may be joined together by brazing in a brazing oven. Although the first and second plates 12, 18 are shown as having the same or similar thickness, the first plate 12 may comprise a heat sink or heat spreader having a thickness which is greater than that of the second plate 18 across at least a portion of its area, as further described below.

As the heat transfer fluid flows through the fluid flow passages 34 it absorbs heat from the battery cells 2, and will gradually become heated as it flows from the inlet port 40 to the outlet port 42. This results in temperature differences, as measured on the outer surface 16 of first plate 12 and/or the TIM 52, between the inlet and outlet sections 64, 66, and particularly between portions of the inlet and outlet sections 64, 66 which are proximate to the inlet port 40 and the outlet port 42. The temperature uniformity (Tmax−Tmin) of heat exchanger 10 is defined by the magnitude of these temperature differences measured at different points on the outer surface 16 of first plate 12 and/or the TIM 52. To avoid negative impacts on battery cells 2, the temperature uniformity of heat exchanger 10 must be maintained within a predetermined range, for example within about 5-8° C.

This is further explained by reference to FIGS. 1, 3 and 7, which show the heat exchanger 10 divided into four zones A, B, C, D, each corresponding to the area of the bottom surface 56 a battery cell 2. Each zone A, B, C and D includes a portion of the inlet section 64 and a portion of the outlet section 66, located on opposite sides of dividing rib 68. These inlet and outlet portions of each zone A, B, C, D are shown in FIG. 7 as being separated by central axis X. Because the temperature of the heat transfer fluid increases as it flows through the heat exchanger 10, there will be temperature differences between the inlet and outlet portions of each zone A, B, C and D. Also, due to the U-flow configuration of heat exchanger 10, the absolute minimum and maximum temperatures of the heat transfer fluid will occur in the respective inlet and outlet portions of zone A. Therefore, the highest temperature differences (and lowest temperature uniformity) are between the inlet and outlet portions of zone A, particularly between the areas immediately adjacent to the inlet and outlet ports 40, 42.

Temperature uniformity is also affected by changes in the heat transfer coefficient caused by the development of boundary layers along the walls of channels 34 as the heat transfer fluid flows from the inlet port 40 to the outlet port 42. The heat transfer coefficient decreases as the boundary layers become more fully developed, and therefore the heat transfer coefficient in the inlet section 64 will generally be higher than in the outlet section 66. This difference in heat transfer coefficient further contributes to the temperature differential between the inlet and outlet sections 64, 66, further reducing temperature uniformity between them.

In addition to maintaining adequate temperature uniformity, maximum battery cell temperatures must be maintained below a specified value, and the pressure drop of the fluid being pumped through the heat exchanger 10 must be maintained within acceptable levels to avoid excessive power consumption.

Figure 8:
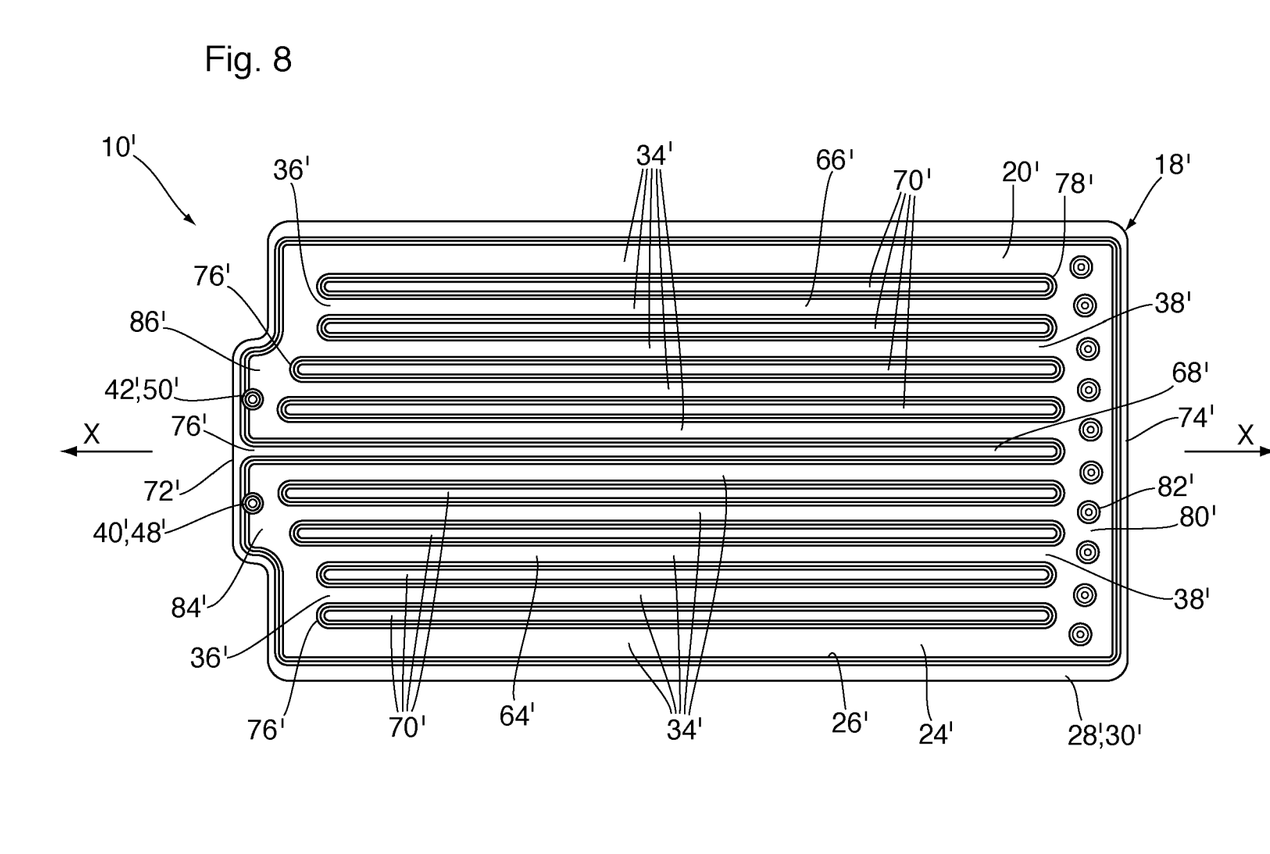
FIG. 8 illustrates a top plan view of a heat exchanger with an alternate bottom plate design.

The importance of temperature uniformity is further explained with reference to FIG. 8, showing the bottom plate 18' of an alternate heat exchanger 10' in which like elements are identified by like, primed reference numerals. The bottom plate 18' includes inlet and outlet sections 64', 66' which are identical mirror images of one another, with the lengths of channel ribs 70' in the inlet section 64' corresponding to the lengths of channel ribs 70' in the outlet section 66'. Due to the identical arrangement of ribs 70' in the inlet and outlet sections 64', 66' of heat exchanger 10', the heat transfer surface areas 88', 90' of the inlet and outlet sections 64', 66' will be the same.

Similarly, when heat exchanger 10' is divided into zones A', B', C', D' corresponding to bottom surfaces 56 of battery cells 2, it can be seen that the same rib pattern exists in the inlet and outlet portions of each zones A', B', C', D'. Therefore, the inlet and outlet portions of each zone A', B', C', D' have the same heat transfer surface area.

The inventors have found that a cold plate heat exchanger 10' having a bottom plate 18' as shown in FIG. 8 will produce an unacceptably high temperature differential, particularly between the inlet and outlet portions of zone A. For example, the inventors have found that the temperature differential between the inlet and outlet portions of zone A of heat exchanger 10' may be 8.33° C., based on Tmin=23.84° C.

Turning back to the first embodiment, heat exchanger 10 includes one or more features to improve temperature uniformity between the inlet and outlet sections 64, 66.

In this regard, the inventors have found that providing heat exchanger 10 with a heat transfer surface area 88 in the inlet section 64 which is smaller than the heat transfer area 90 in outlet section 66 will produce a higher thermal resistance in the inlet section 64, and will also produce better temperature uniformity between the inlet and outlet sections 64, 66.

In some embodiments, the difference in size of heat transfer surface areas 88 and 90 is concentrated in one or more zones of the heat exchanger 10 which are proximate to the inlet and outlet ports 40, 42. For example, where the heat exchanger 10 is visualized as comprising zones A, B, C, D as described above, one or more of zones A, B and C can be provided with a smaller heat transfer surface area in the inlet portion than in the outlet portion.

For example, in some embodiments, each of zones A, B and C is provided with a smaller heat transfer surface area in the inlet portion than in the outlet portion, while zone D has the same heat transfer area in its inlet and outlet portions.

In other embodiments, each of zones A and B is provided with a smaller heat transfer surface area in the inlet portion than in the outlet portion, while each of zones C and D has the same heat transfer areas in its inlet and outlet portions.

In other embodiments, zone A is provided with a smaller heat transfer surface area in its inlet portion than in its outlet portion, while each of zones B, C and D has the same heat transfer areas in its inlet and outlet portions.

Heat exchanger 10 is shown as comprising four zones A, B, C and D, each corresponding to the surface area of the bottom surface 56 of a battery cell 2, with each zone comprising about 25% of the length (measured along axis X) of heat exchanger 10. However, it will be appreciated that both the number and length of the zones can vary from that shown in the drawings, such that the length of each zone may be up to about 60 percent, for example from 10-50 percent of the length of heat exchanger 10. For example, in some embodiments, the zone(s) of inlet and outlet sections 64, 66 in which the differences between the size of heat transfer surface areas 88 and 90 are provided may extend along 10-50 percent of the length of heat exchanger 10, for example from 20-40 percent of the length of heat exchanger 10, as measured along axis X from the first end 72 of heat exchanger 10.

Within the zone(s) in which there is a difference in heat transfer surface area between inlet and outlet portions thereof, the difference in heat transfer surface area may be from about 10 to 80 percent, for example from about 25 to 60 percent.

For example, in heat exchanger 10, only zone A is provided with a smaller heat transfer surface area in its inlet portion than in its outlet portion, while each of zones B, C and D has the same heat transfer areas in its inlet and outlet portions. In this regard, the inlet portion of zone A has a heat transfer surface area which is about 40 percent smaller than that of the outlet portion. This difference in heat transfer surface area within zone A is due to the presence of one or more flow obstructions 92 within the portion of inlet section 64 lying within zone A, as further described below.

Heat exchanger 10 includes a single flow obstruction 92, as shown in FIG. 4. The space occupied by flow obstruction 92 corresponds to about 80 percent of the width (transverse to axis X) of the inlet portion of zone A and about 75 percent of the length (parallel to axis X) of the inlet portion of zone A. In other words, the total width of the heat transfer surface area in the inlet portion of zone A is about 20 percent of the total width of the heat transfer area in the outlet portion of zone A, and the total length of the heat transfer surface area in the inlet portion of zone A is about 25 percent of the total length of the heat transfer surface area 90 in the outlet portion of zone A. Accordingly, the size of the heat transfer surface area in the inlet portion of zone A is about 40 percent less than the size of the heat transfer surface area in the outlet portion of zone A. The inventors have found that this 40 percent reduction in heat transfer surface area between the inlet and outlet portions of zone A provided by flow obstruction 92 produces about a 10 percent improvement in temperature uniformity between the inlet and outlet portions of zone A, as compared with the alternate configuration shown in FIG. 8.

The flow obstruction(s) 92 may occupy from about 20-90 or 50-90 percent of the width of the inlet portion of the zone in which it is provided, and from about 20-90, or 50-90 percent of the length of the zone.

The flow obstruction 92 can be formed as a rib or dimple having a flat or rounded top sealing surface which is sealingly joined to the inner surface 14 of first plate 12. However, in the present embodiment, the flow obstruction 92 is in the form of a "dead channel", meaning that it comprises a continuous outer rib structure 94 which may have a cross-sectional shape similar to that of ribs 68, 70, with a flat or rounded top sealing surface, and with the continuous outer rib structure 94 completely surrounding a depressed middle region 96 which may or may not be co-planar with the planar base 24 of second plate 18, and which is completely cut off from the flow of heat transfer fluid by continuous rib structure 94. In the present embodiment, the middle region 96 extends along a plane which is intermediate between the planar base 24 and the top sealing surface of the outer rib structure 94. Either way, the flow obstruction 92 defines an area within which there is no flow of the heat transfer fluid.

As shown in FIG. 4, the flow obstruction 92 is located between the inlet port 40 and the first ends 76 of channel ribs 70, at which the first open ends 36 of fluid flow passages 34 are defined within the inlet section 64. To accommodate the flow obstruction 92, the channel ribs 70 in inlet section 64 are shortened so that their first ends 76 are spaced farther away from inlet port 40, in comparison to the spacing between the outlet port 42 and the first ends 76 of channel ribs 70 in the outlet section 66.

The flow obstruction 92 has a pair of longitudinally extending side edges 98, 100 with a leading edge 102 and a trailing edge 104 extending widthwise across the inlet section 64. The flow obstruction 92 has rounded corners and bulbous projections 106, 108 along the leading and trailing edges 102, 104. The bulbous projection 106 on the leading edge 102 projects toward the inlet port 40 and assists in providing uniform flow distribution to both sides of the flow obstruction 92, and the bulbous projection 108 on the trailing edge 104 projects toward the first ends 76 of channel ribs 70 in the inlet section 74 and assists in preventing recirculation of fluid flow toward the inlet port 40. Fluid flow spaces are maintained along all four edges 98, 100, 102, 104 of flow obstruction 92, wherein the fluid flow space along the trailing edge 104 provides a manifold space for distribution of the heat transfer fluid to the open ends 36 of fluid flow passages 34 in the inlet section 64.

Figure 9:
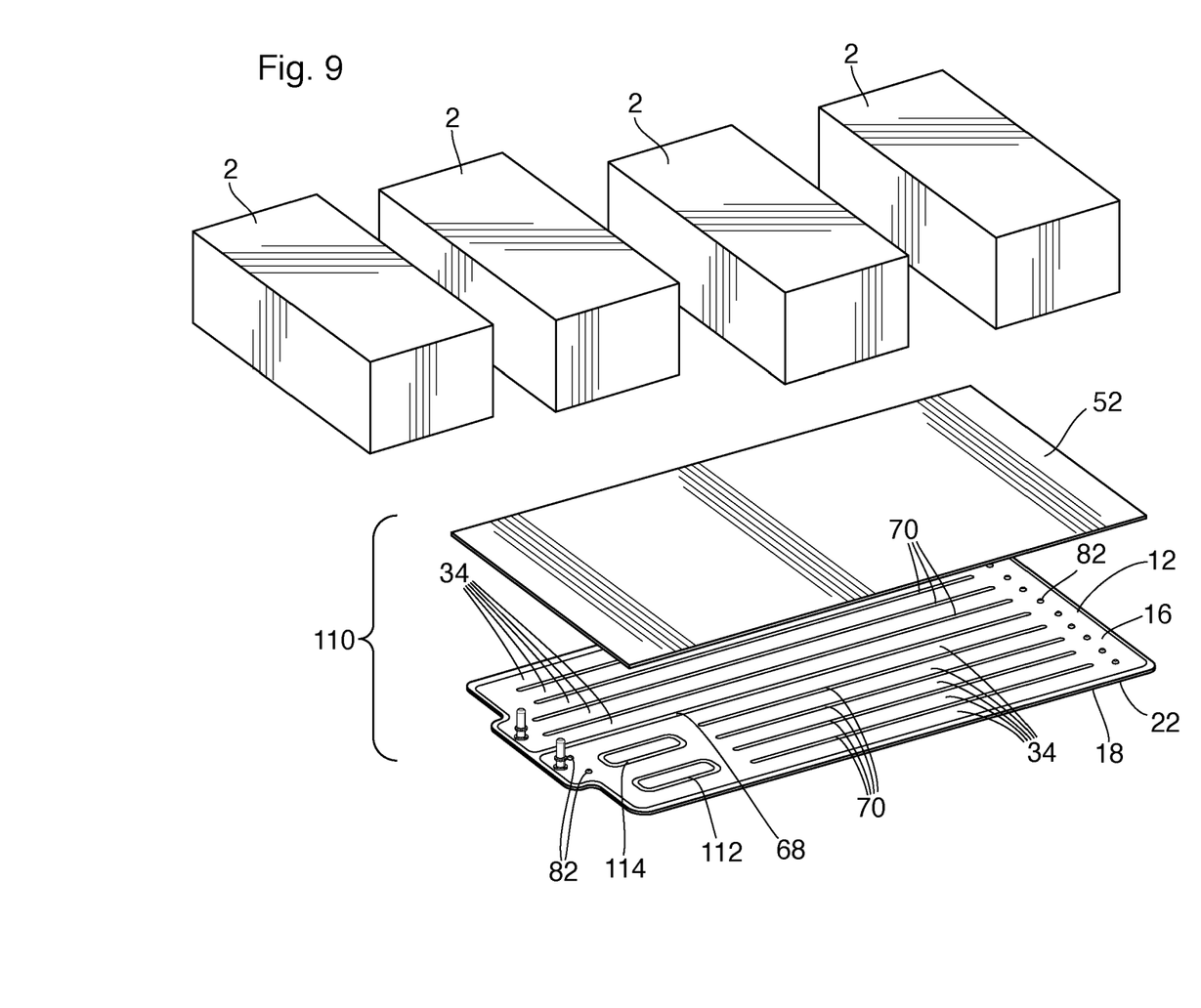
FIG. 9 is an exploded perspective view of a battery heat exchanger with battery cells according to another embodiment.
Figure 10:
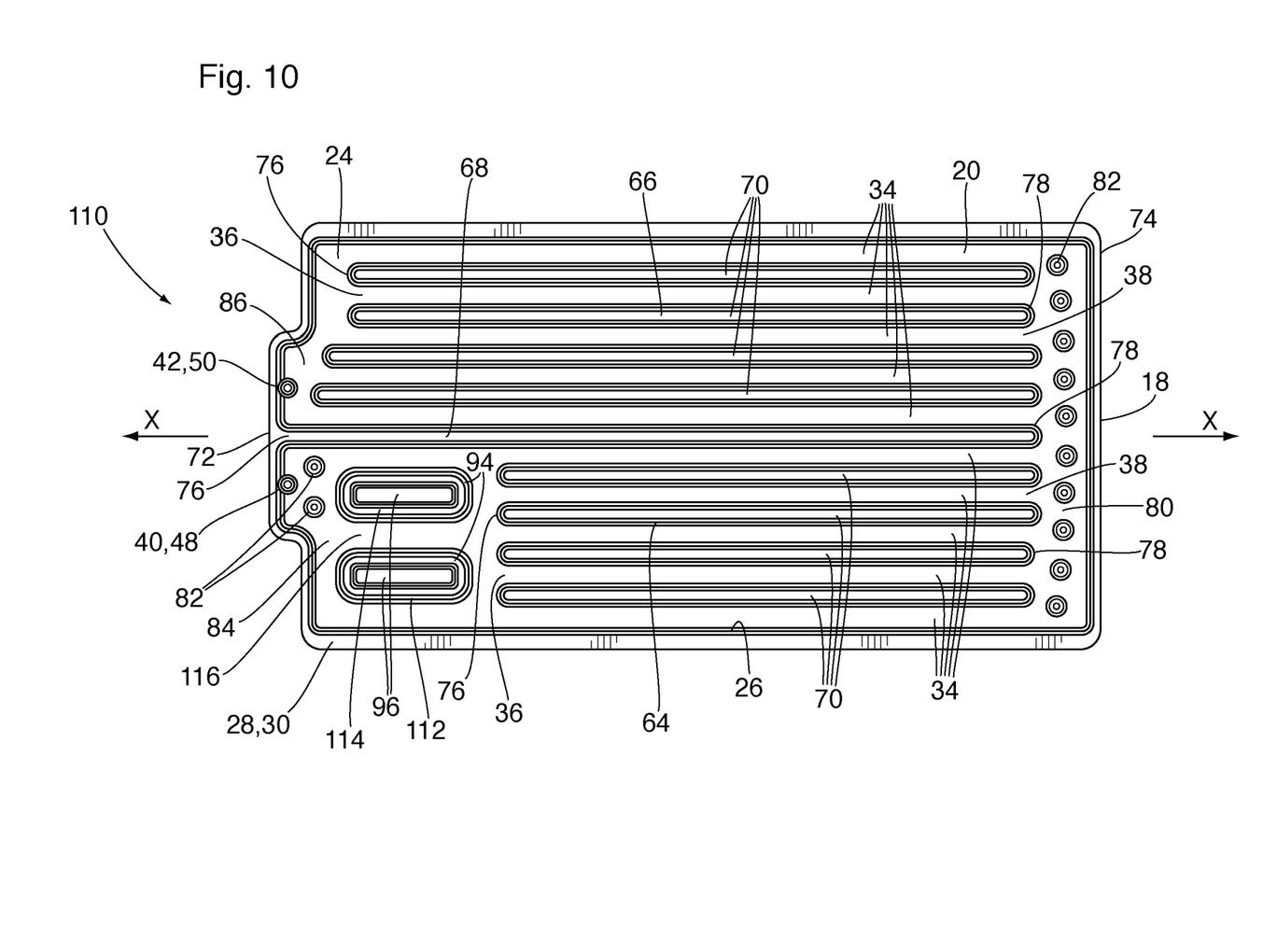
FIG. 10 is a top plan view of the bottom plate of the battery heat exchanger of FIG. 9.

FIGS. 9 and 10 illustrate a heat exchanger 110 according to a second embodiment. Heat exchanger 110 is identical to heat exchanger 10 described above except that flow obstruction 92 of heat exchanger 10 is replaced by a pair of flow obstructions 112, 114, both of which comprise rectangles elongated along axis X and having rounded corners. The other elements of heat exchangers 10 and 110 are identical and are identified by like reference numerals. These flow obstructions 112, 114 are of generally the same length as flow obstruction 92, but their individual and combined widths are less than the width of flow obstruction 92, there being a longitudinal fluid flow passage 116 between the flow obstructions 112, 114. Accordingly, the reduction in heat transfer surface area in the inlet section 64 provided by flow obstructions 112, 114 is less than that provided by flow obstruction 92. As a result, the two flow obstructions 112, 114 will be expected to achieve a lower degree of temperature uniformity than flow obstruction 92, but this reduction in temperature uniformity may be offset by lower pressure drop due to the increased width of the heat transfer surface area in the zone occupied by flow obstructions 112, 114, at least partly due to the provision of longitudinal flow passage 116. It will be appreciated that the heat exchangers disclosed herein may include one, two or greater than two flow obstructions.

Heat exchanger 110 also includes a pair of dimples 82 at the first end 72, between the inlet port 40 and the flow obstructions 112, 114. Dimples 82 provide support in this area, and may also assist in to distributing flow across the width of inlet section 64.

Figure 11:
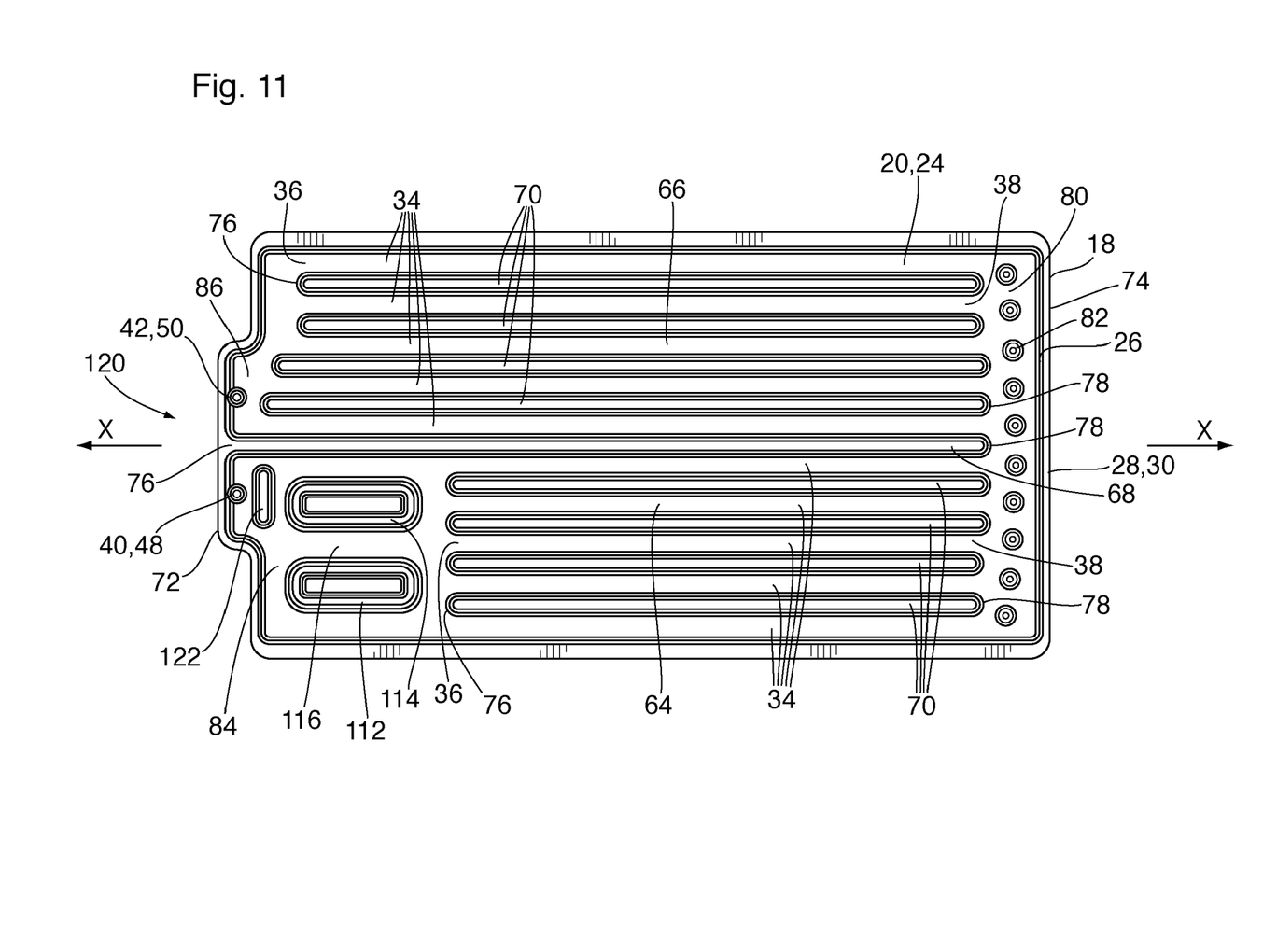
FIG. 11 is a top plan view of the bottom plate of a battery heat exchanger of another embodiment.

FIG. 11 illustrates the bottom plate 18 of a heat exchanger 120 according to a third embodiment. Heat exchanger 120 is identical to heat exchanger 110 described above except that the dimples 82 in the vicinity of the inlet port 40 are replaced by a single, transversely extending rib 122 to provide support and flow distribution across the inlet section 64. The other elements of heat exchanger 120 are identical to the elements of heat exchanger 110 and are identified by like reference numerals.

Figure 12:
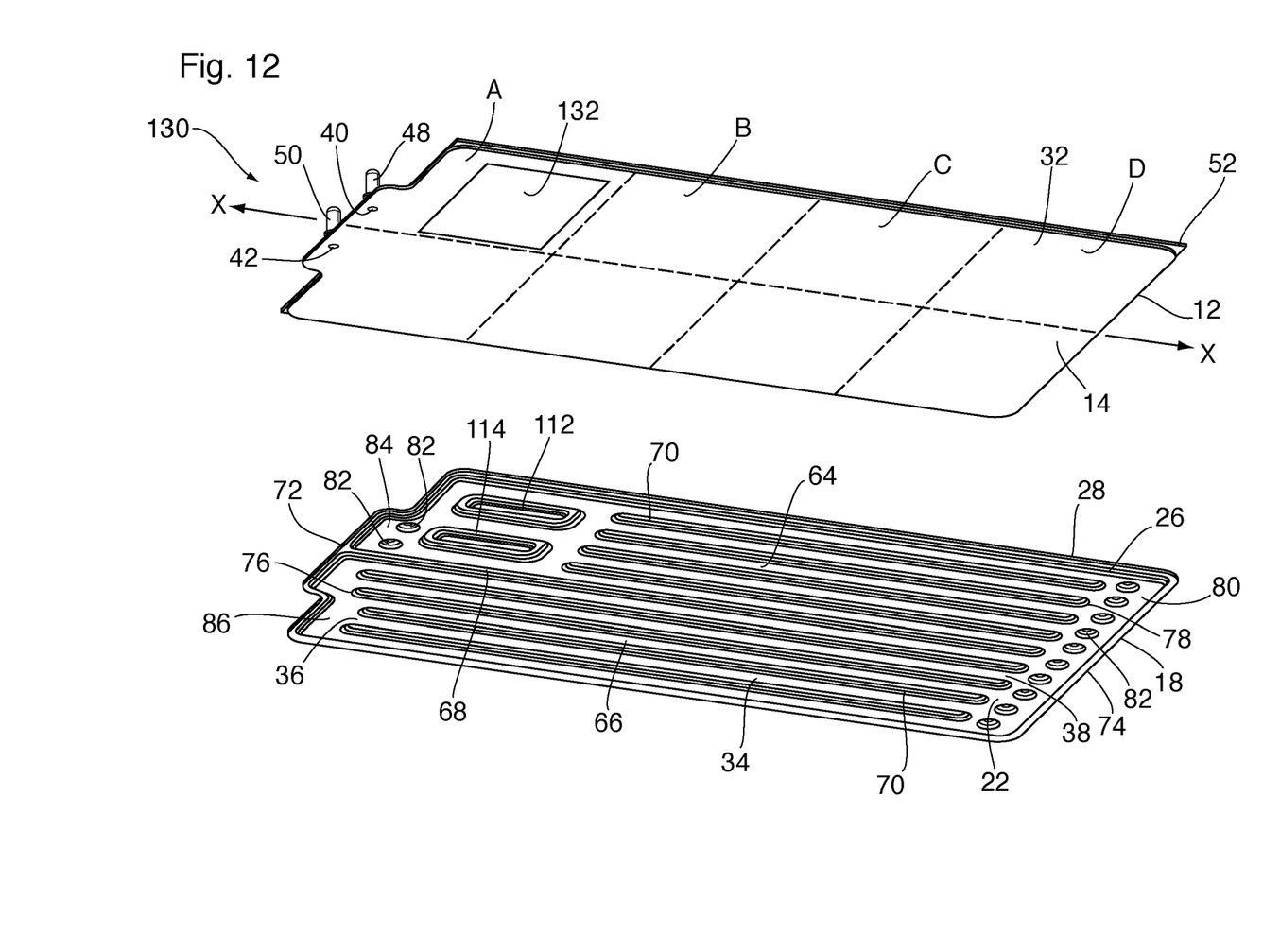
FIG. 12 is an exploded bottom perspective view of a battery heat exchanger of another embodiment.

FIG. 12 illustrates a heat exchanger 130 according to a fourth embodiment. Except as otherwise indicated below, the elements of heat exchanger 130 are similar or identical to the elements of heat exchanger 10 described above, and are identified by like reference numerals.

Instead of, or in addition to, providing flow obstructions in the second plate 18 to improve temperature uniformity, heat exchanger 130 includes features which modify conduction heat transfer across the surface area of first plate 12, in order to improve temperature uniformity between the inlet and outlet sections 64, 66. The second plate 18 of heat exchanger 130 can have the configurations of any of the heat exchangers described above, including the second plate 18' of prior art heat exchanger 10'.

As mentioned above, the first plate 12 functions as a heat sink or heat spreader which conducts heat from the heat transfer fluid to the TIM layer 52 and battery cells 2, typically but not essentially having a thickness in the range of 0.024 to about 0.045 inches. Conduction heat transfer increases with the thickness of the first plate 12, and therefore varying the thickness of the first plate across its area can provide improved temperature uniformity across the outer surface 16 of first plate 12, and/or across the area of TIM 52.

For example, the first plate 12 can be provided with a thickened area 132 in the inlet section 64, having a thickness greater than that in other portions of the first plate 12, wherein the additional plate thickness may be from about 0.008 to about 0.024 inches. Increasing the thickness in area 132 will increase conduction heat transfer from thickened area 132 to surrounding areas of the first plate 12, including areas which may be at a higher temperature than area 132 and/or which may be located in the outlet section 66 of heat exchanger 132, thereby improving temperature uniformity.

Where the heat exchanger 130 is visualized as comprising zones A, B, C and D corresponding to the areas of battery cells 2, the thickened area 132 may for example be provided in the inlet portion of zone A, so as to provide heat spreading across the dividing rib 68 to the outlet portion of zone A, and to also provide heat spreading in longitudinal and transverse directions to one or more of the other zones B, C, D, including portions of these zones which are located in the outlet section 66.

Thickened area 132 can be integrally formed as part of first plate 12, or it may comprise a thin sheet of conductive metal such as aluminum which is joined to the inner surface 14 of first plate 12, for example by laser welding. The thickened area 132 will be have a thickness such that it will not interfere with sealing of the first and second plates 12, 18. For example, the thin sheet of metal in the thickened area may have a thickness ranging from 0.008 to about 0.024 inches.

Although the heat exchangers described herein are cold plates, it will be appreciated that ICE plate heat exchangers are also within the scope of the present disclosure. In this regard, an ICE plate heat exchanger may be constructed from two mirror image shaped plates similar or identical to any of the second plates 18 described above, and optionally having "side-entry" inlet and outlet fittings projecting from one of the edges of the heat exchanger.

While various embodiments have been described in connection with the present disclosure, it will be understood that certain adaptations and modifications of the described exemplary embodiments can be made as construed within the scope of the present disclosure. Therefore, the above discussed embodiments are considered to be illustrative and not restrictive.

What is claimed is:

1. A heat exchanger, comprising:
   a first plate having an inner surface and an outer surface;
   a second plate having an inner surface and an outer surface, wherein the first and second plates are joined together with the inner surface of the first plate and the inner surface of the second plate in opposed facing relation to one another, and with portions of the respective inner surfaces of the first and second plates being spaced apart from one another;
   a plurality of fluid flow passages adapted for flow of a heat transfer fluid, and located between the spaced apart portions of the inner surfaces of the first and second plates;
   a dividing rib which separates the heat exchanger into an inlet section and an outlet section, each of the inlet section and the outlet section including a plurality of the fluid flow passages;
   an inlet port located in the inlet section for supplying the heat transfer fluid to the plurality of fluid flow passages; and
   an outlet port in the outlet section for discharging the heat transfer fluid from the plurality of fluid flow passages;
   wherein both the inlet port and the outlet port are located proximate to a first end of the heat exchanger, on opposite sides of the dividing rib;
   wherein the portions of the inner surfaces of the first and second plates which are spaced apart from one another define a total heat transfer surface area of the heat exchanger, and wherein the total heat transfer surface area is a sum of a heat transfer surface area of the inlet section and a heat transfer surface area of the outlet section; and
   wherein the heat transfer surface area of the inlet section is less than the heat transfer surface area of the outlet section.

2. The heat exchanger according to claim 1, wherein the dividing rib has a first end and a second end and extends along a central longitudinal axis of the heat exchanger, wherein the second end of the dividing rib is spaced from a second end of the heat exchanger to provide a gap through which flow communication is provided between the inlet section and the outlet section.

3. The heat exchanger according to claim 1, wherein the outer surface of the first plate is adapted for thermal contact with bottom surfaces of plurality of battery cells arranged in side-by-side relation along a central longitudinal axis of the heat exchanger;
 wherein the heat exchanger comprises a plurality of zones, each of the zones having an area corresponding to an area of the bottom surface of one of the battery cells;
 each of the zones having an inlet portion lying in the inlet section of the heat exchanger and an outlet portion lying in the outlet section of the heat exchanger; and
 each of the zones having a heat transfer surface area which is a portion of the total heat transfer surface area, with the heat transfer surface area of each of the zones being divided between the inlet section and the outlet section of the heat exchanger.

4. The heat exchanger according to claim 3, wherein one of the plurality of zones comprises a proximal zone which is immediately adjacent to the inlet and outlet ports at the first end of the heat exchanger,
 wherein the heat transfer surface area of the proximal zone is unevenly divided between the inlet and outlet sections of the heat exchanger, with a portion of the proximal zone heat transfer surface area lying in the outlet section being greater than a portion of the proximal zone heat transfer surface area lying in the inlet section.

5. The heat exchanger according to claim 4, wherein one of the zones of the plurality of zones comprises a distal zone which is proximate to a second end of the heat exchanger and farthest from the inlet and outlet ports;
 wherein the heat transfer surface area of the distal zone is evenly divided between the inlet and outlet sections of the heat exchanger.

6. The heat exchanger according to claim 3, wherein the plurality of zones comprises a proximal zone which is immediately adjacent to the inlet and outlet ports at the first end of the heat exchanger, wherein one or more of the zones, including the proximal zone, has a respective heat transfer surface area unevenly divided between the inlet and outlet sections of the heat exchanger, with a portion of the heat transfer surface area lying in the outlet section being greater than a portion of the heat transfer surface area lying in the inlet section; and
 wherein the one or more of the zones have a total length which is about 10-50 percent of a length of the heat exchanger.

7. The heat exchanger according to claim 6, wherein two or more of the zones have the respective heat transfer surface areas unevenly divided between the inlet and outlet sections, and wherein the two or more zones are contiguous.

8. The heat exchanger according to claim 6, wherein, in each of the zones having the respective heat transfer surface area unevenly divided between the inlet and outlet sections of the heat exchanger, the portion of the heat transfer surface area lying in the inlet section is about 10-80 percent smaller than the portion of the heat transfer surface area lying in the outlet section.

9. The heat exchanger according to claim 8, wherein the portion of the heat transfer surface area lying in the inlet section is about 25-60 percent smaller than the portion of the heat transfer surface area lying in the outlet section.

10. The heat exchanger according to claim 6, wherein each of the zones having the respective heat transfer surface area unevenly divided between the inlet and outlet sections of the heat exchanger has at least one flow obstruction provided in the respective inlet portion;
 wherein the one or more flow obstructions occupy from about 50-90 percent of a width of the inlet portion of the zone in which the flow obstruction is provided, and from about 50-90 percent of a length of the zone.

11. The heat exchanger according to claim 1, wherein the inlet section includes one or more flow obstructions located between the inlet port and first ends of the plurality of fluid flow passages in the inlet section.

12. The heat exchanger according to claim 11, wherein each of the flow obstructions comprises a dead channel including a continuous outer rib structure completely surrounding a depressed middle region.

13. The heat exchanger according to claim 12, wherein each of the flow obstructions has a pair of side edges, a leading edge and a trailing edge, all of which partly define regions of fluid flow, such that each of the flow obstructions is completely surrounded by the regions of fluid flow.

14. The heat exchanger according to claim 13, wherein the side edges of each of the flow obstructions are parallel to each other and to the fluid flow passages in the inlet section.

15. The heat exchanger according to claim 13, wherein one or more ribs or dimples are provided between the inlet port and the flow obstruction.

16. The heat exchanger according to claim 1, wherein a thickness of the first plate in a portion of the inlet section is greater than a thickness of the plate in the outlet section.

17. The heat exchanger according to claim 16, wherein the portion of greater thickness in the first plate is provided in an area of the inlet section which is proximate to the inlet port.

18. The heat exchanger according to claim 17, wherein the portion of greater thickness in the first plate is provided by a sheet of metal secured to the inner surface of the first plate.

19. The heat exchanger according to claim 1, wherein the heat exchanger is a cold plate adapted to support a plurality of battery cells on the outer surface of the first plate;
 wherein the inner and outer surfaces of the first plate are substantially flat;
 wherein the second plate is a shaped plate having a generally flat, planar base surrounded by a raised peripheral sidewall extending from the base to a planar flange defining a planar peripheral sealing surface along which the inner surface of the second plate is sealingly joined to the inner surface of the first plate;
 wherein the dividing rib is formed in the second plate, and the second plate further comprises a plurality of channel ribs which define sides of the fluid flow passages; and
 wherein the dividing ribs and the channel ribs have top surfaces which are sealingly joined to the inner surface of the first plate.

20. The heat exchanger according to claim 1, further comprising a layer of thermal interface material is provided on the outer surface of the first plate.

* * * * *